(12) United States Patent
Katayama et al.

(10) Patent No.: US 11,742,163 B2
(45) Date of Patent: Aug. 29, 2023

(54) WELDING DETECTION DEVICE AND WELDING DETECTION METHOD

(71) Applicants: OMRON Corporation, Kyoto (JP); OWL SOLUTION CO., LTD., Kusatsu (JP)

(72) Inventors: Shinichi Katayama, Kyoto (JP); Hiroshi Tsuji, Kusatsu (JP)

(73) Assignees: OMRON CORPORATION, Kyoto (JP); OWL SOLUTION CO., LTD., Shiga (JP)

( * ) Notice: Subject to any disclaimer, the term of this patent is extended or adjusted under 35 U.S.C. 154(b) by 0 days.

(21) Appl. No.: 17/781,709

(22) PCT Filed: Nov. 16, 2020

(86) PCT No.: PCT/JP2020/042610
§ 371 (c)(1),
(2) Date: Jun. 2, 2022

(87) PCT Pub. No.: WO2021/131394
PCT Pub. Date: Jul. 1, 2021

(65) Prior Publication Data
US 2023/0005686 A1   Jan. 5, 2023

(30) Foreign Application Priority Data
Dec. 25, 2019   (JP) ................. 2019-234596

(51) Int. Cl.
*H02H 7/00*   (2006.01)
*H01H 47/00*  (2006.01)
*H02H 7/20*   (2006.01)

(52) U.S. Cl.
CPC ............ *H01H 47/002* (2013.01); *H02H 7/20* (2013.01)

(58) Field of Classification Search
None
See application file for complete search history.

(56) References Cited

U.S. PATENT DOCUMENTS 9,159,512 B2 * 10/2015 Kodama .............. H01H 47/002
10,325,740 B2 * 6/2019 Zotter .................. H01H 47/002
(Continued)

FOREIGN PATENT DOCUMENTS

JP    2000-173428 A    6/2000
JP    2011-135767 A    7/2011
(Continued)

OTHER PUBLICATIONS

International Search Report of International Application No. PCT/JP2020/042610 dated Jan. 12, 2021.
(Continued)

*Primary Examiner* — Stephen W Jackson
(74) *Attorney, Agent, or Firm* — Shinjyu Global IP

(57) ABSTRACT

A welding detection device includes a first circuit including a detection element, a first circuit power supply, and a second circuit. The first circuit is connected to a first line connecting a power supply and a main relay and a second line connecting a load and the main relay. The first circuit power supply supplies DC power to the first circuit. The first circuit detects welding in the main relay based on whether or not a current from the first circuit power supply has flowed to the detection element through the main relay when the main relay is controlled to be in an open state from a closed state. The second circuit cuts off the first circuit only when the voltage difference is present between the first line and the second line while the main relay is controlled to be in an open state from a closed state.

4 Claims, 4 Drawing Sheets

(56) References Cited

U.S. PATENT DOCUMENTS

| | | | |
|---|---|---|---|
| 2003/0080746 A1* | 5/2003 | Imai | H01H 47/002 |
| | | | 324/418 |
| 2010/0194354 A1* | 8/2010 | Gotou | B60L 53/14 |
| | | | 320/111 |
| 2016/0087426 A1 | 3/2016 | Kuranuki et al. | |
| 2020/0049768 A1* | 2/2020 | Matsukawa | B60L 3/0069 |

FOREIGN PATENT DOCUMENTS

| | | |
|---|---|---|
| JP | 2013-73824 A | 4/2013 |
| WO | 2015/045226 A1 | 4/2015 |

OTHER PUBLICATIONS

Written Opinion of the International Searching Authority of International Application No. PCT/JP2020/042610 dated Jan. 12, 2021.

* cited by examiner

WELDING DETECTION DEVICE AND WELDING DETECTION METHOD

This application is the U.S. National Phase of International Application No. PCT/JP2020/042610, filed on Nov. 16, 2020. This application claims priority to Japanese Patent Application No. 2019-234596, filed Dec. 25, 2019. The contents of those applications are incorporated by reference herein in their entireties.

FIELD

The present invention relates to a welding detection device and a welding detection method.

BACKGROUND

Conventionally, a means for monitoring a voltage applied to a relay to detect welding in the relay is generally used as a method for detecting whether or not welding occurs at a contact in the relay. In this method, however, while no voltage is applied, the welding in the relay cannot be detected accurately. To address the issue, Japanese Unexamined Patent Application Publication No. 2000-173428 discloses a welding detection device for detecting welding in a relay by detecting, with a detection element, the presence or absence of a current flowing through the relay when the relay is controlled to be in an open state.

SUMMARY

For example, when the above welding detection device is used in a switching device configured to switch the power supply to be connected to the load from a single-phase three-wire AC power supply to another AC power supply, the welding detection device may erroneously detect welding. Specifically, as shown in FIG. 4, in a case where a welding detection device 90 is set to detect a welding in a relay 91 configured to open and close the load and the power supply, it is possible that, when a voltage of AC100 V between a neutral line N and a power line L1 is applied to the relay 91, an alternating current flows from the line 92, which is connecting the load and the power supply, to the welding detection device 90 without passing through the relay 91, and the current further flows to the detection element, resulting in erroneous detection of welding in the relay 91 by the welding detection device 90.

An object of the present invention is to prevent erroneous detection of welding by a welding detection device configured to detect welding in a relay based on the presence or absence of a current flowing through the detection element.

A welding detection device according to one aspect of the present invention detects welding in a main relay configured to open and close a connection between a load and a power supply that supplies AC power to the load. The welding detection device includes a first circuit, a first circuit power supply, and a second circuit. The first circuit is connected to a first line connecting the power supply and the main relay and a second line connecting the load and the main relay. The first circuit includes a detection element. The first circuit power supply supplies DC power to the first circuit. The second circuit is connected to the first circuit and detects a voltage difference between the first line and the second line. The first circuit detects welding in the main relay based on whether or not a current from the first circuit power supply has flowed to the detection element through the main relay when the main relay is controlled to be in an open state from a closed state. The second circuit cuts off the first circuit only when the voltage difference is present between the first line and the second line while the main relay is controlled to be in an open state from a closed state.

In the welding detection device, when the main relay is controlled to be in an open state from a closed state, the first circuit is cut off by the second circuit only when a voltage difference is present between the first line and the second line, so as to disable the detection element in the first circuit. That is, while a voltage is applied to the main relay, the alternating current of the power supply can be prevented from flowing from the second line into the first circuit without passing through the main relay. With the configuration, the welding detection circuit can be hindered from erroneously detecting welding in the main relay due to the alternating current of the power supply that flows from the second line into the first circuit without passing through the main relay and then to the detection element.

The first circuit may further include a first relay configured to open and close a connection to the first line and a second relay configured to open and close a connection to the second line.

The welding detection device may be mounted on a switching device configured to switch the power supply for supplying AC power to the load from one of a first system power supply and a second system power supply to the other. The switching device may include a main relay. The main relay may include a first main relay configured to open and close a connection between the first system power supply and the load, and a second main relay configured to open and close a connection between the second system power supply and the load.

A welding detection method according to one aspect of the present invention is for detecting welding in a main relay configured to open and close a connection between a load and a power supply for supplying AC power to the load. A welding detection device includes a first circuit and a first circuit power supply. The first circuit includes a detection element for detecting a current and is connected to a first line connecting the power supply and the main relay and a second line connecting the load and the main relay. The first circuit power supply supplies a direct current to the first circuit. The welding detection method includes a step for detecting welding in the main relay based on whether or not the current from the first circuit power supply has flowed to the detection element through the main relay when the main relay is controlled to be in an open state from a closed state, and a step of cutting off the first circuit only when a voltage difference is present between the first line and the second line while the main relay is controlled to be in an open state from a closed state.

DETAILED DESCRIPTION

Figure 1:
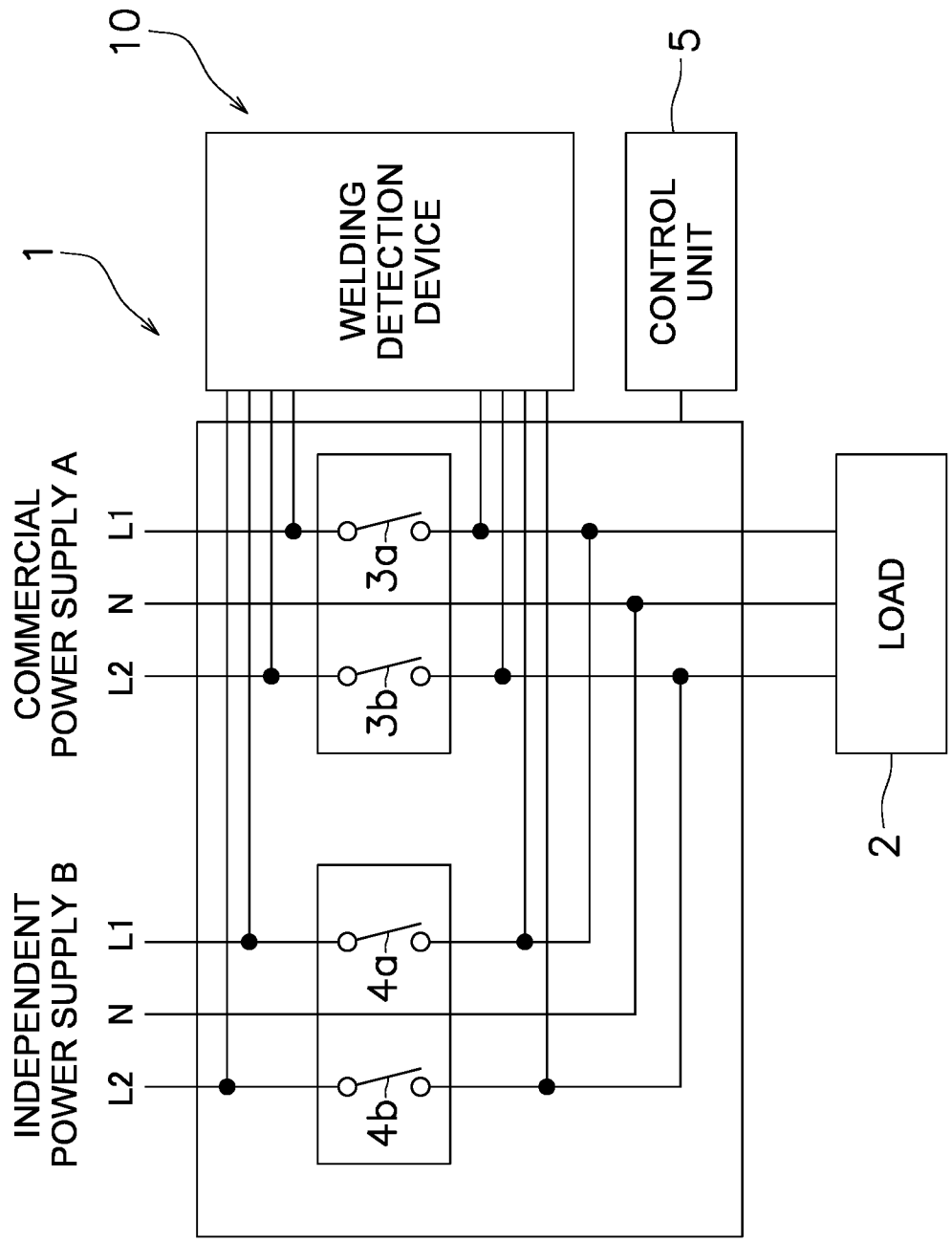
FIG. 1 is a diagram schematically showing a configuration of a power supply switching device incorporating a welding detection device.

FIG. 1 is a diagram schematically showing a configuration of a power supply switching device 1 in which a welding detection device 10 according to an aspect of the present invention is incorporated. The power supply switching device 1 switches the power supply for supplying AC power to a load 2 from one of a first system power supply and a second system power supply to the other. Specifically, when the supply of AC power from a commercial power supply A to the load 2 is cut off due to a failure such as a power outage, the power supply switching device 1 switches the power supply for supplying AC power to the load 2 is switched from the commercial power supply A to another commercial power supply or an independent power supply B. The independent power supply B is, for example, a source of power generated by a solar power generation system.

The power supply switching device 1 according to the present embodiment switches the power supply for supplying AC power to the load 2 from one of the commercial power supply A and the independent power supply B to the other. The commercial power supply A and the independent power supply B are each a single-phase three-wire AC power supply. In the single-phase three-wire system, a voltage of AC100 V is applied to power lines L1 and L2 with reference to a neutral line N.

The power supply switching device 1 includes main relays 3a and 3b, main relays 4a and 4b, and a control unit 5. The main relays 3a, 3b, 4a, and 4b are latching relays having an a-type contact. The main relays 3a, 3b, 4a, and 4b open and close the connection between the load 2 and the power supply that supplies AC power to the load 2. The main relays 3a and 3b are examples of the first main relay, and the main relays 4a and 4b are examples of the second main relay. The main relays 3a, 3b, 4a, and 4b may be any relays other than latching relays. For example, The main relays 3a, 3b, 4a, and 4b may be a relay in which the contact is kept in an open state or a closed state only while the coil is excited.

The main relays 3a and 3b open and close the connections between the commercial power supply A and the load 2. The main relay 3a opens and closes the connection between the power line L1 of the commercial power supply A and the load 2. The main relay 3b opens and closes the connection between the power line L2 of the commercial power supply A and the load 2. The main relays 4a and 4b open and close the connections between the independent power supply B and the load 2. The main relay 4a opens and closes the connection between the power line L1 of the independent power supply B and the load 2. The main relay 4b opens and closes the connection between the power line L2 of the independent power supply B and the load 2. Note that a configuration is possible in which a main relay is also arranged on the neutral line N and the main relay on the neutral line N opens and closes the connections between the commercial power supply A and the independent power supply B and the load 2.

The control unit 5 controls the opening and closing of the main relays 3a, 3b, 4a, and 4b. The control unit 5 simultaneously controls the opening and closing of the main relay 3a and the main relay 3b. The control unit 5 simultaneously controls the opening and closing of the main relay 4a and the main relay 4b. For example, when AC power is supplied from the commercial power supply A to the load 2, the control unit 5 controls the main relays 3a and 3b to be in the closed state and controls the main relays 4a and 4b to be in the open state. Note that a configuration is possible in which a main relay is also arranged on the neutral line N such that the main relay on the neutral line N is controlled to open and close in conjunction with the main relays 3a, 3b, 4a, and 4b.

When switching the power supply to be connected to the load 2 from the commercial power supply A to the independent power supply B, the control unit 5 controls the main relays 3a and 3b to be in an open state from a closed state, and controls the main relays 4a and 4b to be in a closed state from an open state. In contrast, when switching the power supply to be connected to the load 2 from the independent power supply B to the commercial power supply A, the control unit 5 controls the main relays 3a and 3b to be in an open state from a closed state, and controls the main relays 4a and 4b to be in a closed state from an open state. When the control unit 5 detects, for example, that the supply of AC power from the commercial power supply A to the load 2 is cut off, the control unit 5 controls the main relays 3a and 3b to be in an open state from a closed state, and controls the main relays 4a and 4b to be in a closed state from an open state.

The welding detection device 10 detects welding in the main relays 3a, 3b, 4a, and 4b when the power supply switching device 1 switches the power supply to be connected to the load 2. For example, when the power supply to be connected to the load 2 is switched from the commercial power supply A to the independent power supply B, the main relays 3a and 3b are switched from the closed state to the open state, and welding in the main relays 3a and 3b is detected. When no welding is detected in the main relays 3a and 3b, the control unit 5 controls the main relays 4a and 4b to be switched to be in a closed state from an open state. In the present embodiment, one welding detection device 10 is configured to detect welding of all the main relays 3a, 3b, 4a, and 4b. Alternatively, the welding detection device 10 may be individually mounted to the main relays 3a, 3b, 4a, and 4b so as to individually detect welding in the main relays 3a, 3b, 4a, and 4b.

Figure 2:
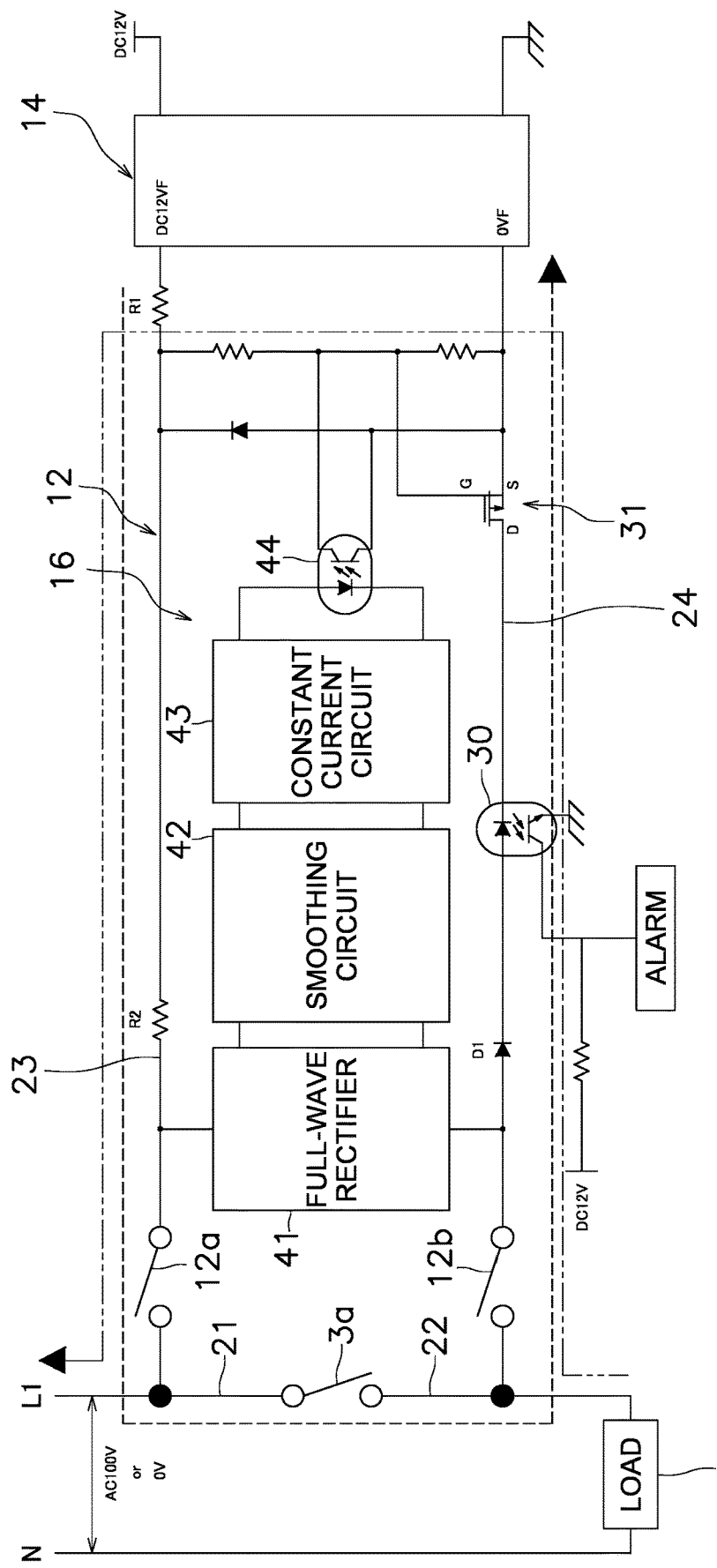
FIG. 2 is a diagram schematically showing a circuit diagram of a welding detection device.

FIG. 2 is a diagram schematically showing a circuit diagram of the welding detection device 10. The welding detection device 10 includes a first circuit 12, a first circuit power supply 14, and a second circuit 16. The first circuit 12 is connected to the first line 21 that connects the power line L1 of the commercial power supply A and the main relay 3a, and the second line 22 that connects the load 2 and the main relay 3a.

The first circuit 12 includes a third line 23 connected to the first line 21 and a fourth line 24 connected to the second line 22. The third line 23 and the fourth line 24 are connected to the first circuit power supply 14. The third line 23 has current-limiting resistors R1 and R2. Further, the fourth line 24 has a diode D1 for protecting the circuit.

The first circuit 12 includes a first relay 12a and a second relay 12b. The first relay 12a is disposed on the third line 23 and opens and closes a connection between the first line 21 and the first circuit 12. The second relay 12b is disposed on the fourth line 24 and opens and closes a connection between the second line 22 and the first circuit 12. The first relay 12a and the second relay 12b are simultaneously controlled to be open or closed in response to, for example, a control signal from the control unit 5. The first relay 12a and the second relay 12b are controlled to be switched to be in a closed state from an open state so as to detect welding in the main relay 3a. The first relay 12a and the second relay 12b may be switching elements such as transistors and FETs.

The first circuit 12 includes a detection element 30 and a transistor 31. The detection element 30 is, for example, a photocoupler, and includes a light emitting diode and a phototransistor. The detection element 30 detects the current flowing through the fourth line 24. The first circuit 12 detects welding in the main relay 3a based on whether or not the current from the first circuit power supply 14 has flowed to the detection element 30 through the main relay 3a.

The detection element 30 has an output end where a power supply is connected via a resistor. When no current flows through the detection element 30, the detection element 30 is turned off. That is, the detection element 30 is in a state where a voltage is applied from the power supply, and the detection element 30 outputs a high signal for a high voltage. Contrarily, when a current flows through the detection element 30, the detection element 30 is turned on and outputs a low signal. Upon the output of a low signal from the detection element 30, a well-known notification means such as an alarm notifies of welding in the main relay 3a.

The transistor 31 is disposed on the fourth line 24. The transistor 31 is disposed between the detection element 30 and the first circuit power supply 14. The transistor 31 is controlled to be in an ON state all the time such that the first circuit 12 normally operates.

The first circuit power supply 14 is composed of an isolated DC/DC converter and supplies a direct current to the first circuit 12. As shown in FIG. 2, the first circuit power supply 14 supplies a direct current to the first circuit 12 so that the current flows from the third line 23 to the fourth line 24 through the main relay 3a.

The second circuit 16 is connected to the first circuit 12 and detects a voltage difference between the first line 21 and the second line 22. That is, the second circuit 16 detects a voltage difference between the contacts of the main relay 3a. The second circuit 16 cuts off the first circuit 12 only when a voltage difference is present between the first line 21 and the second line 22 while the main relay 3a is controlled to be in an open state from a closed state, and disables the detection element 30.

The second circuit 16 is connected to the third line 23 and the fourth line 24. The second circuit 16 includes a full-wave rectifier 41, a smoothing circuit 42, a constant current circuit 43, and a photocoupler 44. When a voltage difference is generated between the first line 21 and the second line 22, the photocoupler 44 is turned from off to on via the full-wave rectifier 41, the smoothing circuit 42, and the constant current circuit 43. When the photocoupler 44 is turned on, the transistor 31 located in the first circuit 12 is short-circuited between G-S, and the transistor 31 is turned from on to off. As a result, the first circuit 12 is cut off.

Figure 3:
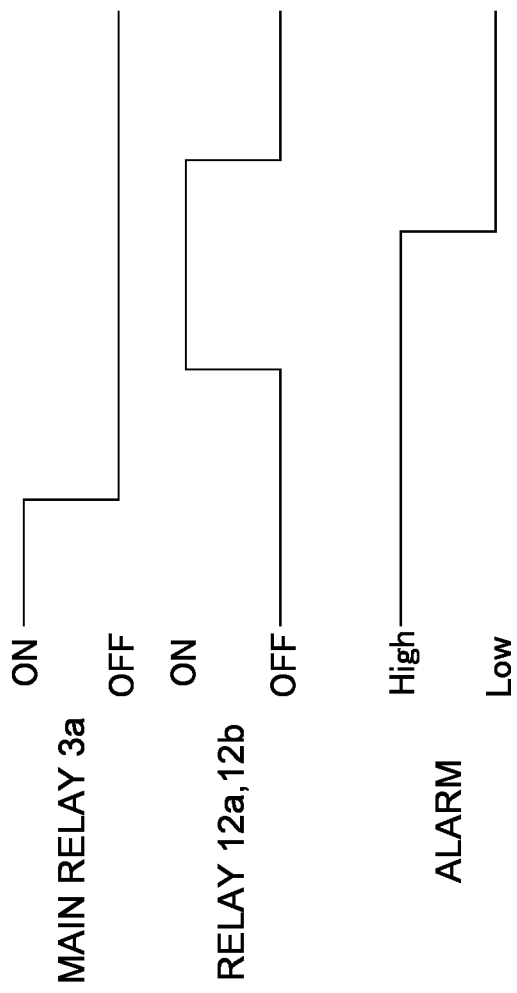
FIG. 3 is a timing chart showing the timings at which a main relay, a first relay, and a second relay operate.
Figure 4:
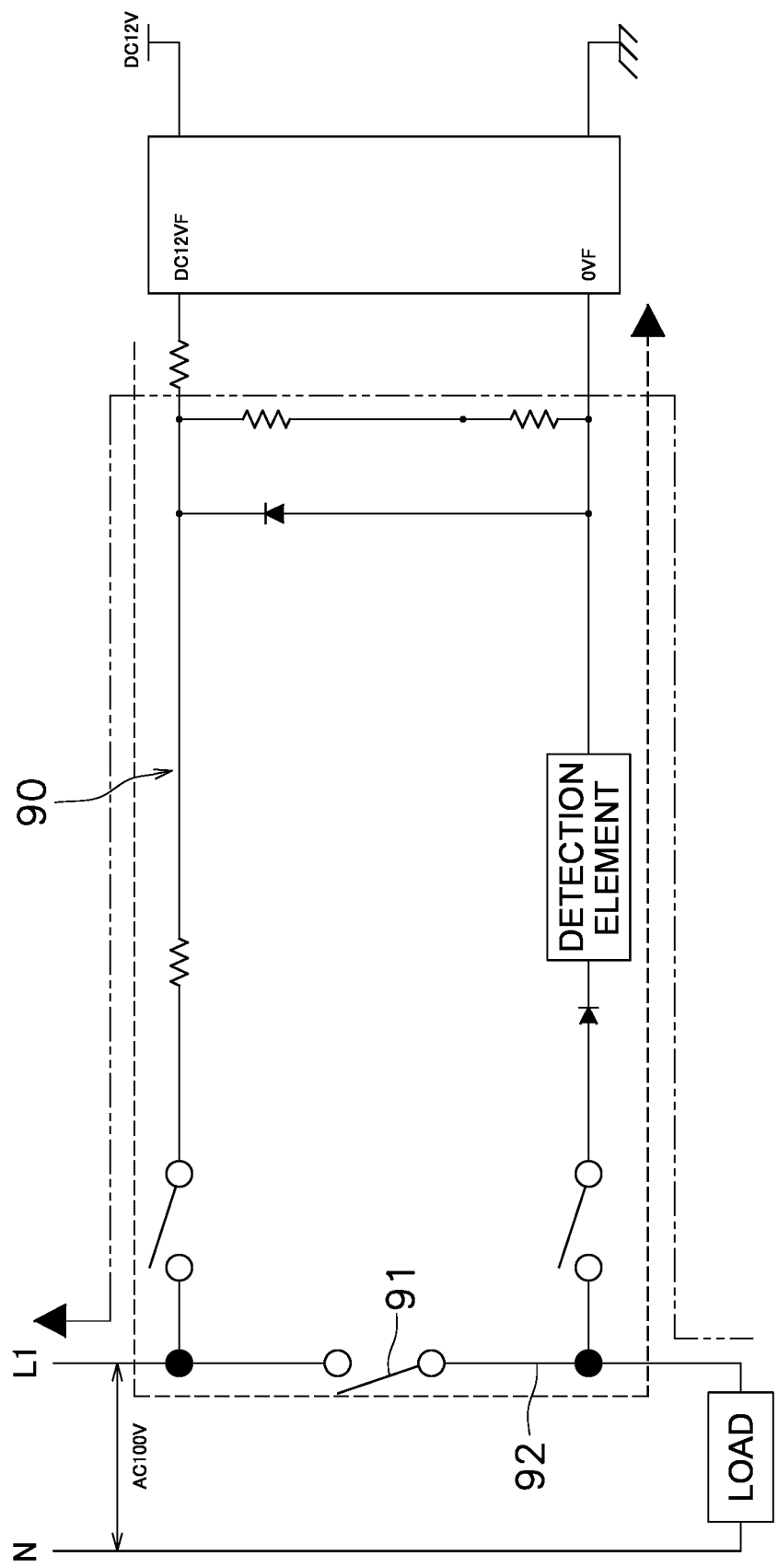
FIG. 4 is a diagram for illustrating a problem to be solved in a welding detection device.

Next, with reference to FIGS. 2 and 3, the operation of the welding detection device 10 for detecting welding in the main relay 3a when the power supply to be connected to the load 2 is switched from the commercial power supply A to the independent power supply B will be described. FIG. 3 is a timing chart showing the timings at which the main relay 3a, the first relay 12a, and the second relay 12b operate. The control unit 5 controls the first relay 12a and the second relay 12b to be in a closed state from an open state after controlling the main relay 3a to be in an open state from a closed state. As a result, the first circuit 12 is connected to the power line L1.

As shown by the broken line in FIG. 3, if welding occurs in the main relay 3a, the direct current from the first circuit power supply 14 flows from the third line 23 to the detection element 30 through the main relay 3a. As a result, the detection element 30 outputs a low signal, and a notification means such as an alarm notifies the welding.

If no welding occurs in the main relay 3a, the direct current from the first circuit power supply 14 does not flow to the detection element 30. Accordingly, the detection element 30 remains in the off state, and the high signal is continuously output from the detection element 30. As a result, the control unit 5 determines that no welding occurs in the main relay 3a, controls the main relay 4a to be in the closed state from the open state, and switches the power supply to be connected to the load 2 from the commercial power supply A to the independent power supply B. Note that, in practice, regarding the main relay 3b as well, the power supply to be connected to the load 2 is switched after the welding detection device 10 determines that no welding occurs in the main relay 3b by a similar method.

Here, when no welding occurs in the main relay 3b and a voltage of 100 V is applied to the power line L1 with reference to the neutral line N, a voltage difference of AC100 V is generated between the first line 21 and the second line 22. Thus, when the first circuit 12 is connected to the power line L1, the AC100 V current may flow backward from the second line 22 side to the third line 23 of the first circuit 12 as shown by the two-dot chain line in FIG. 2. The current may further flow to the detection element 30, resulting in erroneous detection of welding in the main relay 3a by the welding detection device 10.

In order to prevent such erroneous detection, when a voltage difference of 100 V is generated between the first line 21 and the second line 22, the first circuit 12 is cut off by the second circuit 16. Specifically, when a voltage difference (here, for example, a voltage difference of 100 V) is generated between the first line 21 and the second line 22, the photocoupler 44 of the second circuit 16 is turned on. Then, the turning on of the photocoupler 44 forces the transistor 31 to be turned on from off, so that the first circuit 12 is cut off. As a result, the current of AC100 V can be limited from flowing into the detection element 30. That is, the detection element 30 is kept in the off state and continuously outputs a high signal, and thereby any erroneous detection of welding in the main relay 3a by the welding detection device 10 can be prevented.

If no voltage difference is generated between the first line 21 and the second line 22, the current of AC100 V does not flow backward from the second line 22 side to the first circuit 12. Thus, as described above, the first circuit 12 is used to detect welding in the main relay 3a based on whether or not the direct current from the first circuit power supply 14 has flowed to the detection element 30.

The operation of the welding detection device 10 when switching the power supply to be connected to the load 2 from the independent power supply B to the commercial power supply A is the same as that in the case of welding detection in the main relay 3a, except for the main relays for detecting welding (in this case, the main relays 4a and 4b), and thereby description thereof will be omitted.

One embodiment of a welding detection device according to one aspect of the present invention has been described above, but the present invention is not limited to the above embodiment, and various modifications can be made without departing from the gist of the present invention.

In the above embodiment, welding in the main relay 3a is detected by a current flowing through the detection element 30, but for example, the welding detection device 10 may be configured so that welding in the main relay 3a can be detected by the absence of a current flowing through the detection element 30.

In the above embodiment, a configuration is illustrated in which the power supply switching device 1 switches the power supply for supplying AC power to the load 2 from one of the commercial power supply A and the independent power supply B to the other, but the power supplies switched by the power supply switching device 1 are not limited to those in the above embodiment. Any configuration is possible in which the power supply for supplying AC power to the load 2 is switched from one of the first system power supply and the second system power supply to the other. For example, the power supply switching device 1 may be configured to switch between the commercial power supply A and the backup power supply, and further the commercial power supply may not necessarily be used.

In the above embodiment, a configuration in which the welding detection device 10 is mounted to the power supply switching device 1 is illustrated, but the applications of the welding detection device 10 are not particularly limited. The welding detection device 10 can be used in various devices and circuits.

REFERENCE NUMERALS

2 Load
3a, 3b, 4a, 4b Main relays
10 Welding detection device
12 First circuit
14 First circuit power supply
16 Second circuit
30 Detection element
21 First line
22 Second line

The invention claimed is:

1. A welding detection device configured to detect welding in a main relay, the main relay being configured to open and close a connection between a load and a power supply, the power supply being configured to supply AC power to the load, the welding detection device comprising:
a first circuit including a detection element configured to detect a current, the first circuit being connected to a first line and a second line, the first line being configured to connect the power supply and the main relay, the second line being configured to connect the load and the main relay;
a first circuit power supply configured to supply a direct current to the first circuit; and
a second circuit connected to the first circuit, the second circuit being configured to detect a voltage difference between the first line and the second line,
the first circuit configured to detect welding in the main relay based on whether or not a current from the first circuit power supply has flowed to the detection element through the main relay when the main relay is controlled to be in an open state from a closed state, and
the second circuit configured to cut off the first circuit only when the voltage difference is present between the first line and the second line while the main relay is controlled to be in the open state from the closed state.

2. The welding detection device according to claim 1, wherein
the first circuit further includes a first relay configured to open and close a connection with the first line and a second relay configured to open and close a connection with the second line.

3. The welding detection device according to claim 1, wherein
the welding detection device is mounted on a switching device configured to switch the power supply from one of a first system power supply or a second system power supply to another of the first system power supply or the second system power supply,
the switching device includes the main relay, and
the main relay includes a first main relay and a second main relay, the first main relay being configured to open and close a connection between the first system power supply and the load, the second main relay being configured to open and close a connection between the second system power supply and the load.

4. A welding detection method conducted by a welding detection device configured to detect welding in a main relay, the main relay being configured to open and close a connection between a load and a power supply, the power supply being configured to supply AC power to the load,
the welding detection device including:
a first circuit including a detection element configured to detect a current, the first circuit being connected to a first line and a second line, the first line being configured to connect the power supply and the main relay, the second line being configured to connect the load and the main relay, and
a first circuit power supply configured to supply a direct current to the first circuit,
the welding detection method comprising:
detecting welding in the main relay based on whether or not a current from the first circuit power supply has flowed to the detection element through the main relay when the main relay is controlled to be in an open state from a closed state; and
cutting off the first circuit only when a voltage difference is present between the first line and the second line while the main relay is controlled to be in the open state from the closed state.

* * * * *